United States Patent [19]
Johnson et al.

[11] Patent Number: 5,455,910
[45] Date of Patent: Oct. 3, 1995

[54] METHOD AND SYSTEM FOR CREATING A SYNCHRONIZED PRESENTATION FROM DIFFERENT TYPES OF MEDIA PRESENTATIONS

[75] Inventors: William J. Johnson, Flower Mound; Robert P. Welch, Colleyville, both of Tex.

[73] Assignee: Internal Business Machines Corporation, Armonk, N.Y.

[21] Appl. No.: 999

[22] Filed: Jan. 6, 1993

[51] Int. Cl.⁶ .................................................... G06F 15/00
[52] U.S. Cl. .................... 395/650; 395/153; 395/118; 395/892; 395/826; 364/275.1; 364/281.3; 364/DIG. 1
[58] Field of Search ................................... 395/800, 700, 395/650, 550, 275, 200, 157, 154, 153, 118; 364/514

[56] References Cited

U.S. PATENT DOCUMENTS

| 5,268,846 | 12/1993 | Bonsall et al. | 364/514 |
| 5,274,758 | 12/1993 | Beitel et al. | 395/154 |
| 5,307,456 | 4/1994 | Mackay | 395/154 |
| 5,333,299 | 7/1994 | Koval et al. | 395/550 |
| 5,363,484 | 11/1994 | Victor et al. | 395/157 |
| 5,367,621 | 11/1994 | Cohen et al. | 395/154 |

OTHER PUBLICATIONS

*IBM Announces Multimedia PM for OS/2*, Newsbytes News Network, Jul. 2, 1992.
*Integrators, VARs pair to meet customer needs*, Computer Reseller News, Aug. 3, 1992.
Chips: Breakthrough Family of Video Chips for Multimedia & Videoconferencing Applications, Edge Publishing, Aug. 10, 1992.
Digital World: Radius Announces Videovision, Newsbytes news network, Jun. 24, 1992.
*QuickTime steals the spotlight*, by Steve Rosenthal, Infoworld Mar. 9, 1992, pp. 565, 568–569.

Primary Examiner—Alyssa H. Bowler
Assistant Examiner—Alpesh M. Shah
Attorney, Agent, or Firm—Geoffrey A. Mantooth

[57] ABSTRACT

A presentation made up of plural descriptions is provided. Each description specifies the data that is to be played by selected output devices, as well as parametrical values for playing the data on the selected output devices. The presentation is readied for execution by processing each description and loading the specified data into memory. An element containing the parametrical values and the location of the data is loaded into a queue. The presentation is executed by taking each element in turn from the queue and executing the specified data on the selected output devices.

20 Claims, 15 Drawing Sheets

New Presentation:

| | | | | | |
|---|---|---|---|---|---|
| Presentation 5: 747 departing airport | 0 | 0 | 0 | 1 | VMP3 |
| Presentation 7: Arrival at Company | 0 | 0 | 0 | 1 | VMP3 |
| Presentation 23: Meeting with Chairman | 0 | 0 | 0 | 1 | VMP3 |
| Presentation 11: Chairman's summary | 0 | 0 | 0 | 1 | VMP3 |
| ⋮ | ⋮ | ⋮ | ⋮ | ⋮ | ⋮ |
| Presentation 7: Departing Company | 0 | 0 | 0 | 1 | VMP3 |

Presentation Portion Library:

| Library Entry 1 |
|---|
| Library Entry 2 |
| Library Entry 3 |
| ⋮ |
| Library Entry K |

| Presentation 7: Departing Company |
|---|
| X:\VIDEO\ARCHIVE\MEET1.VID |
| 456783 |
| 7834562 |
| VIDEO PLAY |
| Arg1,Arg2,... |

*Fig. 4*

| | |
|---|---|
| ... | ~41 |
| Pres 11 | |
| Sych handle 345 | |
| 4 | PDE #41 |
| 0 | |
| 1 | |
| Video Mon1, Video Mon2, Video Mon 47 | |
| Pres 11 | |
| Sych handle 345 | |
| 4 | |
| 4 | PDE #42 |
| 1 | |
| Video Mon 8, Video Mon 9 | |
| Pres 6678 | |
| Sych handle 345 | |
| 4 | PDE #43 |
| 0 | |
| 1 | |
| Stage Light 1, Stage Light 9, Stage Light 12 | |
| Pres 7148 | |
| Sych handle 345 | |
| 4 | |
| 0 | PDE #44 |
| 2 | |
| Stereo Speakers 18, Stereo Speakers 99 | |
| Pres 89256 | |
| 0 | |
| 0 | PDE #45 |
| 0 | |
| 85 | |
| Drum Device 783 | |
| ... | |

*Fig. 5*

Synchronization Table Entry (STE)

| |
|---|
| Sych handle |
| Current Entry Count |
| Location |
| Offset |
| Length |
| Function |
| Function Arguments |
| Delay Time |
| Repetition Count |
| Peripheral Device List |
| Next Element Pointer |

FIFO Process Queue Element (FPQE)

| |
|---|
| Thread Type |
| Location |
| Offset |
| Length |
| Function |
| Function Arguments |
| Delay Time |
| Repetition Count |
| Peripheral Device List |

10
METHOD AND SYSTEM FOR CREATING A SYNCHRONIZED PRESENTATION FROM DIFFERENT TYPES OF MEDIA PRESENTATIONS

FIELD OF THE INVENTION

The present invention relates to methods and systems for creating presentations in multitasking data processing systems that operate plural output devices.

BACKGROUND OF THE INVENTION

Data processing systems are utilized in conjunction with output devices, such as speakers, video display panels, and slide projectors, to produce multimedia presentations for informational, educational and entertainment purposes. The data processing system functions as the controller of the output devices. The data processing system executes software that contains the instructions for operating the output devices. This software prescribes the particular output devices that are utilized during the multimedia production, the data that is to be played by a particular output device (for example, the specific music that is produced by a speaker) and time parameters such as the sequence in which the output devices are activated.

The prior art suffers from several disadvantages. One such disadvantage is the inability to synchronize many varieties of output devices on a generic basis. The prior art allows dubbing, wherein certain sequences are recorded into a prior recording. Dubbing is only permitted on a media that is capable of storing information for more than one media. For example, with the prior art, it is difficult to dub an interface generated by a computer and entertainment visuals such as stage lights, laser shows, smoke blasts and mechanized stunt action with a video and/or sound presentation. It is desired to provide the possibility of synchronizing an arbitrary variety of media across an arbitrary set of peripherals, wherein overlapping presentation times can be implemented.

Another disadvantage of the prior art is the inability to manage data from a generic multimedia perspective. Current prior art methods build the instructional software by copying segments from old instructional software. This duplication is inefficient and may require extra storage capacity. Furthermore, such prior art methods may inadvertently change the old or source software when constructing new instructional software. Furtherstill, the prior art constrains the amount of a source software that can be copied. Frequently, only a particular segment or a portion thereof is required in new instructional software. Yet the prior art may require copying plural segments instead of just one segment, or an entire segment, instead of a portion of that segment. Thus, the selectivity allowed by the prior art leaves something to be desired.

SUMMARY OF THE INVENTION

It is an object of the present invention to provide a method and system for creating a synchronized presentation from an arbitrary number and type of output devices.

It is a further object of the present invention to provide a method and system that provides a single merged presentation that supports overlapping presentation times.

It is a further object of the present invention to provide a method and system that manages the data of a presentation in a generic manner.

A presentation made up of plural descriptions is provided. Each description specifies the data that is to be played by selected output devices, as well as parametrical values for playing the data on the selected output devices. The presentation is readied for execution by processing each description and loading the specified data into memory. An element containing the parametrical values and the location of the data is loaded into a queue. The presentation is executed by taking each element in turn from the queue and executing the specified data on the selected output devices.

In one aspect, the present invention provides the descriptions in the presentation in the same order that the descriptions are to be executed and played. Thus, each description is processed and executed in order.

Plural descriptions can be linked together so as to be executed at the same time. The synchronized descriptions are linked together by using a Synch Handle as one of the parametrical values. Also, the number of descriptions having the same Synch Handle is specified by a Synch Count, which is a parametrical value. By using the Synch Handle and Synch Count, the synchronized descriptions need not be contiguous in the presentation. When the descriptions are processed for execution, the synchronized descriptions are put into a temporary storage and linked together. When all of the synchronized descriptions with the same Synch Handle have been linked together in the temporary storage, they are then loaded into the queue for execution.

The parametrical values include delay time, which is the amount of time that the data is delayed playing on the output devices after the beginning of execution. Thus, by using the Synch Handle, plural descriptions can be linked together. However, by specifying a delay time, the synchronized descriptions need not play at the same time and in fact the play times need not overlap at all.

Other parametrical values that may be specified in a description include Qualified Source, Offset, Length, Repetition Count and Function. The Qualified Source is the file name of the data that is to be played on an output device. The Offset is the starting point inside of the Qualified Source. The Length is the length of pertinent data in the Qualified Source, starting from the Offset. The Repetition Count is the number of times that the specified data is to be played on the output devices. The Function is the executable function capable of playing the Qualified Source data on some output device.

BRIEF DESCRIPTION OF THE DRAWINGS

FIG. 4 shows an example of a New Presentation.

FIG. 5 shows another example of a New Presentation.

FIG. 8 shows a representation of an arbitrary Synchronization Table Entry.

FIG. 9 shows a representation of an arbitrary First-In-First-Out Process Queue Element.

DESCRIPTION OF PREFERRED EMBODIMENT

Figure 1:
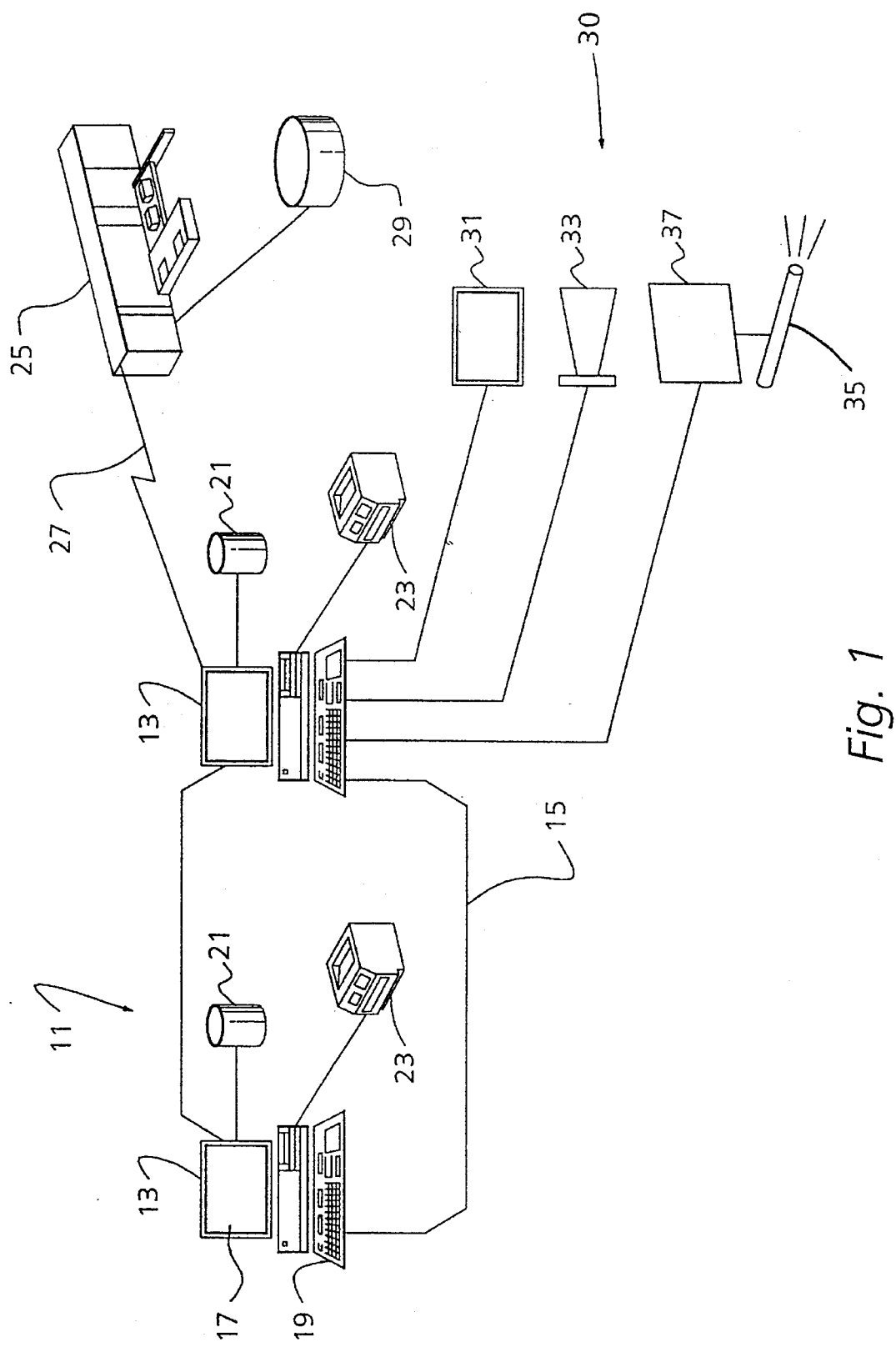
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user or process of the present invention executing within the data processing system 11.

One of the computers 13 is connected to plural output devices 30, a sampling of which is shown. A video monitor panel 31 provides a screen for visual displays, a speaker system 33 provides stereo sound and one or more robotic lights 35 are used as stage lights. Each light 35 has a controller 37, which controls light movement, intensity, focus, color, etc. These output devices 30 allow the data processing system 11 to present multimedia presentations. The output devices could be any transducer, action producing mechanical device, or any other device suitable for a presentation.

The data processing system 11 may also include a mainframe computer 25 that is coupled to one of the computers by a communication link 27. The mainframe computer 25 may also be coupled to a storage device 29 which may serve as a remote storage for the computers.

Figure 2:
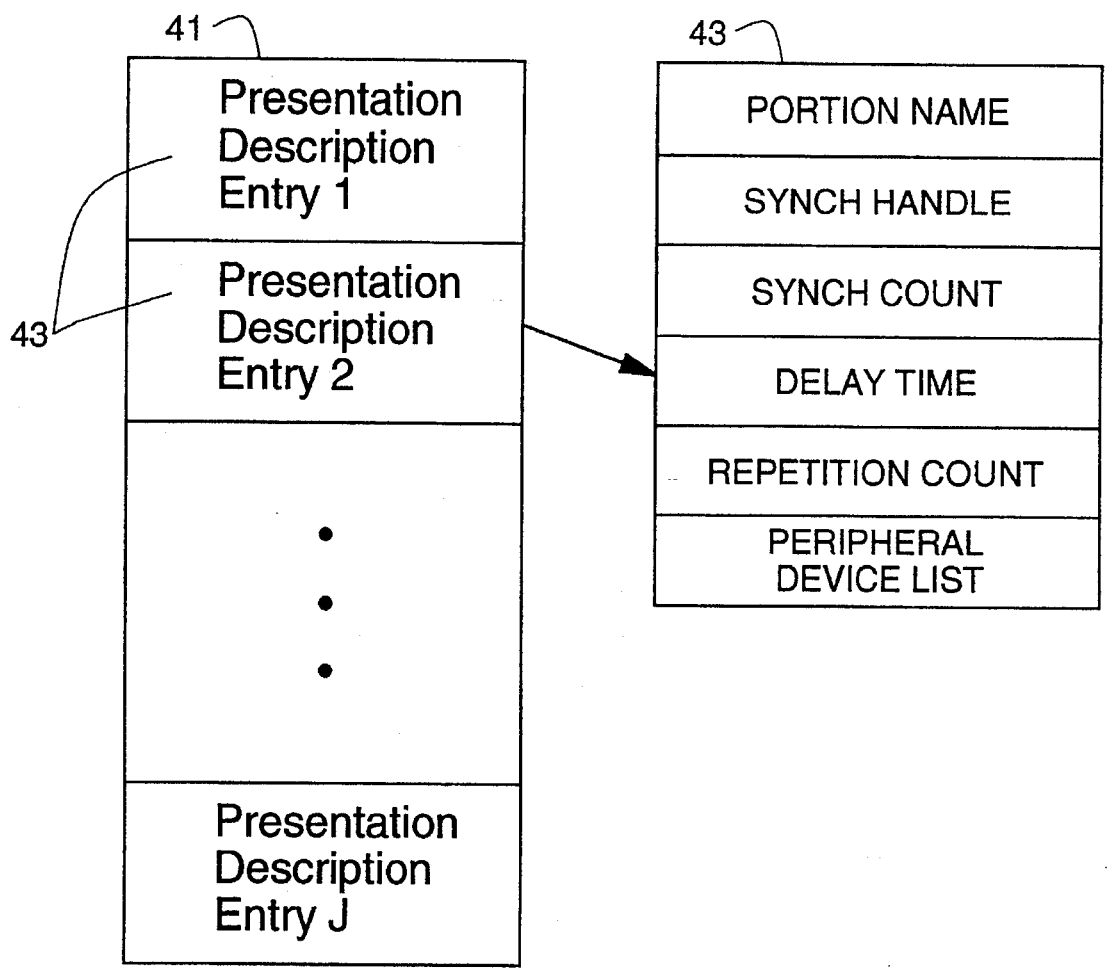
FIG. 2 shows a representation of a New Presentation and the parameters of an arbitrary Presentation Description Entry.
Figure 3:
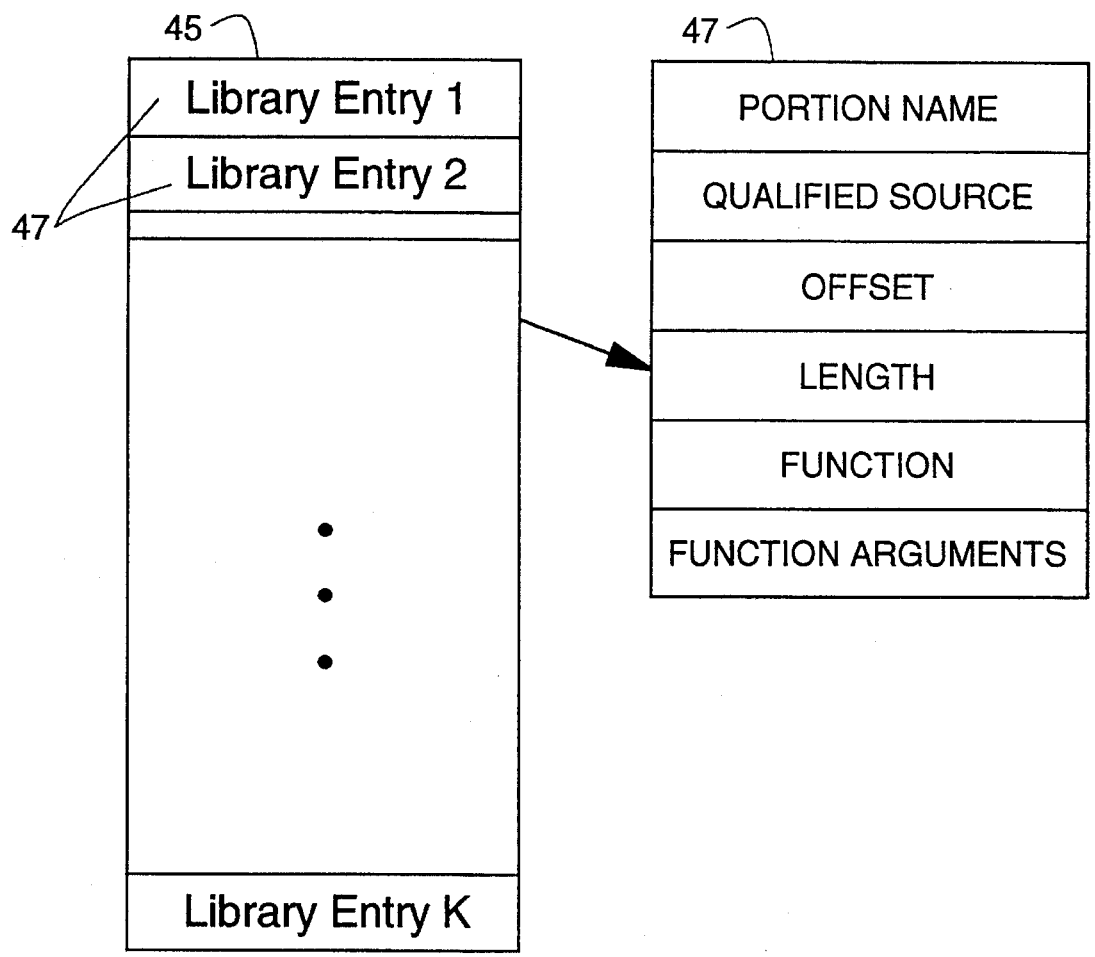
FIG. 3 shows a representation of a Presentation Portion Library and the parameters of an arbitrary Presentation Portion Library Entry.

The data processing system 11 controls the output devices 30 by a set of instructions referred to as a New Presentation 41. Referring to FIG. 2, a New Presentation 41 is made up of an ordered listing of Presentation Description Entries 43. By using Presentation Description Entries 43, an editor or user who is constructing a New Presentation can utilize portions of old presentations by assigning a unique name to those portions. The portions can be obtained from any entry 47 in a Presentation Portion Library 45, as shown in FIG. 3. The Presentation Portion Library 45 can be stored on the specific computer 13 being utilized by the user or it can be stored remotely, such as on the mainframe 25. In addition, the Presentation Portion Library 45 can be created by the user, or it could be part of an existing data base.

Referring back to FIG. 2, the parameters in a Presentation Description Entry 43 will be described. The parameters are: Portion Name; Synch Handle; Synch Count; Delay Time; Repetition Count; and Peripheral Device List. The Portion Name is a reference or handle to an associated entry in the Presentation Portion Library. The Synchronization Handle is a user defined name that is assigned to those Presentation Description Entries that are to be executed at the same time. Both the Portion Name and the Synch Handle can be alphabetic, alphanumeric or numeric strings, or numeric binary identifiers. The Synch Count is the number of entries that have the same Synch Handle. The Synch Count has a maximum number, which depends on the particular computer used to execute the New Presentation. This is determined by the number of entries that can be reasonably started at the same time on the computer. The Delay Time is the amount of time that the Presentation Description Entry is delayed before being played on the specified output device or devices. Thus, even though two or more Presentation Description Entries may be executed at the same time, by virtue of their having the same Synchronization Handle, use of the Delay Time allows a user to offset the starting points of each Presentation Description Entry. For example, a first Presentation Description Entry having a Delay Time of 0 may execute and play at the very beginning of the presentation. A second Presentation Description Entry may have a Delay Time of two minutes, wherein the second Presentation Description Entry would be executed at the same time the first Presentation Description Entry is executed, but would not be played on an output device until two minutes into the presentation. The Delay Time may be expressed in any valid units. The Repetition Count is the number of times that the Presentation Description Entry is played. The Peripheral Device List provides the identifiers for the specific output device or devices 30 that are to be used by the Presentation Description Entry.

Referring to FIG. 3, the parameters of a Presentation Portion Library entry 47 will be described. These parameters are: Portion Name; Qualified Source; Offset; Length; Function; and Function Arguments. The Portion Name is the same name that is to be referenced in a particular Presentation Description Entry. The Portion Name is typically a shorthand name that is easy to comprehend by the user. The more specific name is provided by the Qualified Source, which is the fully qualified file name to the presentation member. This can be a data file or an executable file located on a LAN 15 (see FIG. 1) or on a local storage device 21. The Offset is the starting point inside of the qualified source. The Offset is represented as a value from the beginning of the qualified source. The Length is the Length of pertinent data in the Qualified Source, starting from the Offset. By using the Offset and Length parameters, a user can select portions from a Qualified Source, instead of the entire qualified source. The Offset and Length parameters may be represented as any valid units, such as bits, bites, words, full words, etc. A negative or zero Length indicates that all of the data in the qualified source is to be utilized. For example, if the qualified source contains a musical composition, then the entire composition is specified by a negative or zero Length parameter. Otherwise, Offset and Length can be specified to select, for example, only a few measures of the composition. The Function is the executable function capable of playing the Qualified Source file on an output device. The Function Arguments are arguments to the Function, if any are provided. The system play functions support many calling arguments.

Referring now to FIG. 4, an example of a New Presentation 41 is shown. To briefly summarize the plot of the New Presentation, the presentation shows an airplane departing an airport, the arrival at the company, meeting with the chairman of the company, the chairman's summary, and so on to the end, where the departure from the company is shown by the presentation. The first Presentation Description Entry 43A (represented by the first row of the New Presentation 41) has the following parameters: Portion Name="Presentation 5: 747 departing airport"; Synch Handle=0; Synch Count=0; Delay Time=0; Repetition Count=1; and Peripheral Device List=VMP3 (for video monitor panel #3). All of the Presentation Description Entries have zeros for their Synch Handles and Synch Counts, indicating that none of the Presentation Description Entries will be played simultaneously together. Instead, the Presentation Description Entries will be played sequentially. In other words, the first Presentation Description Entry 43a will be played in its entirety before the second Presentation Description Entry 43b is played, and so on. All of the Presentation Description Entries have a delay count of 0, wherein each Presentation Description Entry will be executed instantly upon parse encounter. (Parse encounter is the processing of the New Presentation and will be explained in more detail hereinafter.) All of the Presentation Description Entries have a Repetition Count of 1, indicating that each Presentation Description Entry is played only once. All of the Presentation Description Entries are played on VMP3, or video monitor panel 3, which is a screen 31 (see FIG. 1).

Also shown in FIG. 4 is an example of the Presentation Portion Library entry that is associated with the last Presentation Description Entry 43X ("Presentation 7: departing company") of the New Presentation. This last Presentation Description Entry 43X is associated with Library Entry 2, 47B, in the Presentation Portion Library 45. The parameters of Library Entry 2, 47B, are: Portion Name="Presentation 7: departing company" (this is the same name as the Portion Name of the Presentation Description Entry 43X, as the Portion Name is how the Presentation Description Entry is linked to a particular Presentation Portion Library); Qualified Source=X:\video\archive\meet1.vid; Offset=456783; Length=7834562; Function=Video Play ( ), which is a well known video play Function; and a list of Arguments, arg1, arg2 . . . to the Video Play ( ) Function. Only a portion of the data in the Qualified Source is utilized. This is because the starting point is specified by the Offset as being non-zero and the Length of the data is a positive number. The Qualified Source can be a file or any peripheral such as a tape drive or a CD-ROM. The Function can be a globally known system address executable Function, a dynamically linked executable Function or any representation capable of invoking an independently packaged procedure.

In FIG. 5, there is shown another example of a New Presentation 41. There are five Presentation Description Entries shown. Presentation Description Entry #41 has the following parameters values: Portion Name=Pres 11; Synch Handle=Sych handle 345, Synch Count=4, Delay Time=0, Repetition Count=4 and Peripheral Device List=Video Monitors 1, 2 and 47. Presentation Description Entry numbers 41–44 have the same Synch Handle of "Sych Handle 345". Also Synch Count=4 provides that there are four Presentation Description Entries with this particular Synch Handle. Thus, when the New Presentation is executed, all four of these Presentation Description Entries will be executed together. Presentation Description Entry numbers 41–44 have overlapping presentation times.

Because of the way the New Presentation 41 is processed and executed, Presentation Description Entry numbers 41–44 need not be contiguous to each other within the presentation. For example, Presentation Description Entry #41 could be located at the very beginning of the New Presentation. Yet, because its presentation time is overlapping with Presentation Description Entry numbers 41–44, it will be executed when Presentation Description Entry #44 is executed. When the New Presentation is processed for execution, the New Presentation is parsed, wherein each Presentation Description Entry is taken and processed in turn. The parsing procedure begins with the first Presentation Description Entry, processes it, gets the second Presentation Description Entry in the New Presentation, processes it, gets the third Presentation Description Entry and so on. When a Presentation Description Entry is processed and found to be tied to other Presentation Description Entries by virtue of its Synch Handle and Synch Count, then that Presentation Description Entry (or at least its relevant information) is stored in a temporary work table. The work table is used to link all of the Presentation Description Entries having the same Synch Handle together, so that they can be executed together. When the last Presentation Description Entry of the Synch Handle group is processed, then the other linked Presentation Description Entries will also be executed.

This feature makes it easy to edit a New Presentation. If an editor or user wishes to add a Presentation Description Entry which is to be executed at the same time as Presentation Description Entry #44, then the user need not search through the New Presentation listings to find Presentation Description Entry #44. Instead, the Presentation Description Entry can be added to the front of the New Presentation, or some other location before the occurrence of Presentation Description Entry #44. The added Presentation Description Entry has Synch Handle=Sych Handle 345. A searching routine can be implemented to automatically search for those Presentation Description Entries having the same Synch Handle and to increment the Synch Count of those Presentation Description Entries.

Even though Presentation Description Entries may be executed at the same time, they need not be played on output devices at the same time. Instead, overlapping presentations can be provided. For example, Presentation Description Entries 41–44 will all be executed together. However, Presentation Description Entry #42 has a Delay Time=4. Thus, the playing of Presentation Description Entry #42 on the specified output devices will be delayed by 4 time units (for example, minutes) after Presentation Description Entries 41, 43 and 44 (which have 0 Delay Times) are played on their respective output devices. By adjusting the Delay Time, the Offset and the Length, the amount of overlap between Presentation Description Entries can be adjusted.

Presentation Description Entry #44 will be played twice, because its Repetition Count=2.

In the flow charts of FIGS. 6a, 6b and 10a–11, the following graphical conventions are observed: a rectangle for either a process, Function or screen display, a subrectangle or diamond for a decision and a circle for a connector in exiting to or entering from another part of the flow chart. These conventions are well understood by programmers skilled in the art and the flow charts are sufficient to enable a programmer skilled in the art to write code in any suitable computer programming language, such as BASIC, PASCAL or C for a computer such as the IBM Personal System/2 (PS/2) family of computers which supports these languages.

Figure 6A:
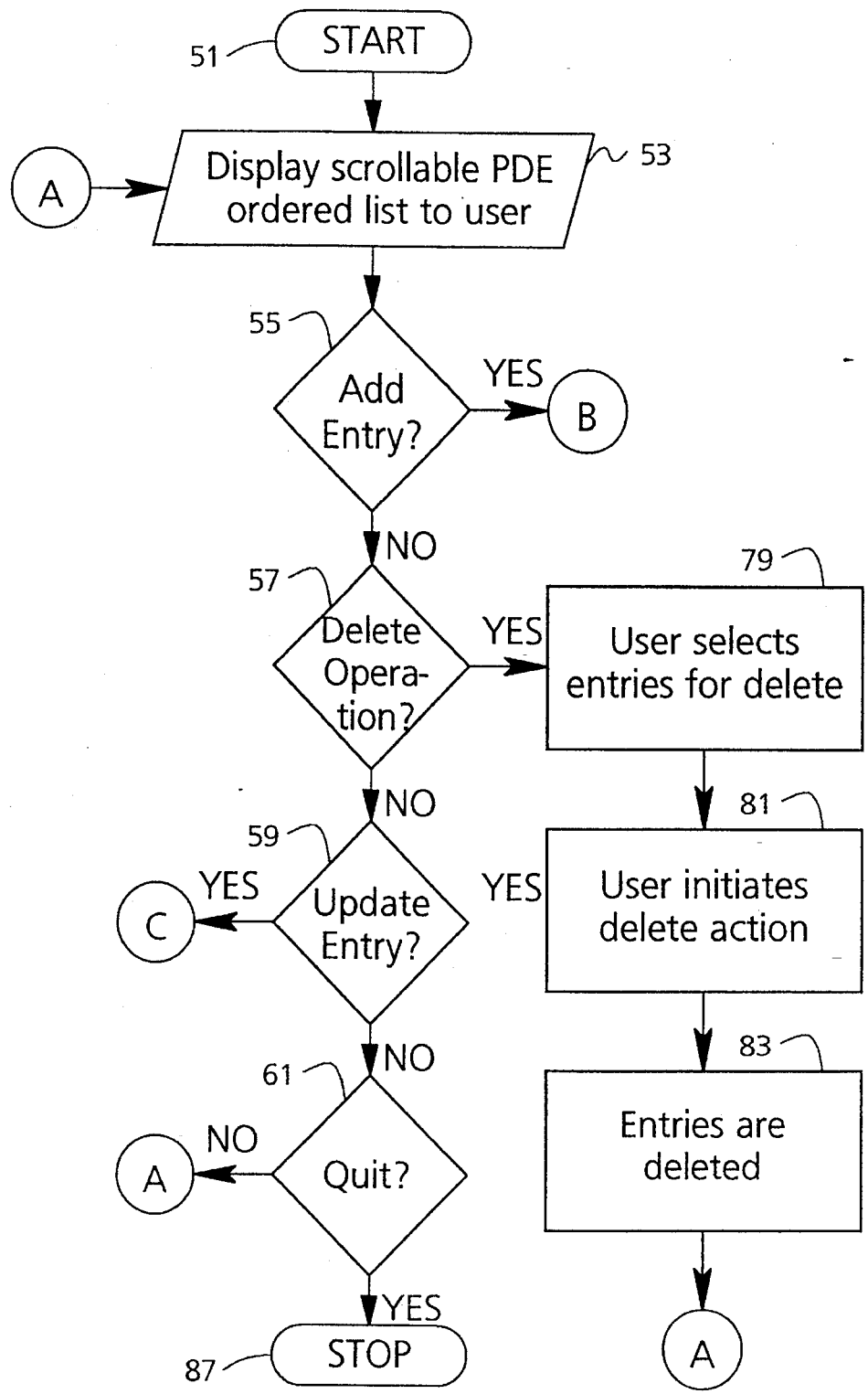
FIGS. 6a and 6b are flow charts showing how a New Presentation is constructed and edited.
Figure 6B:
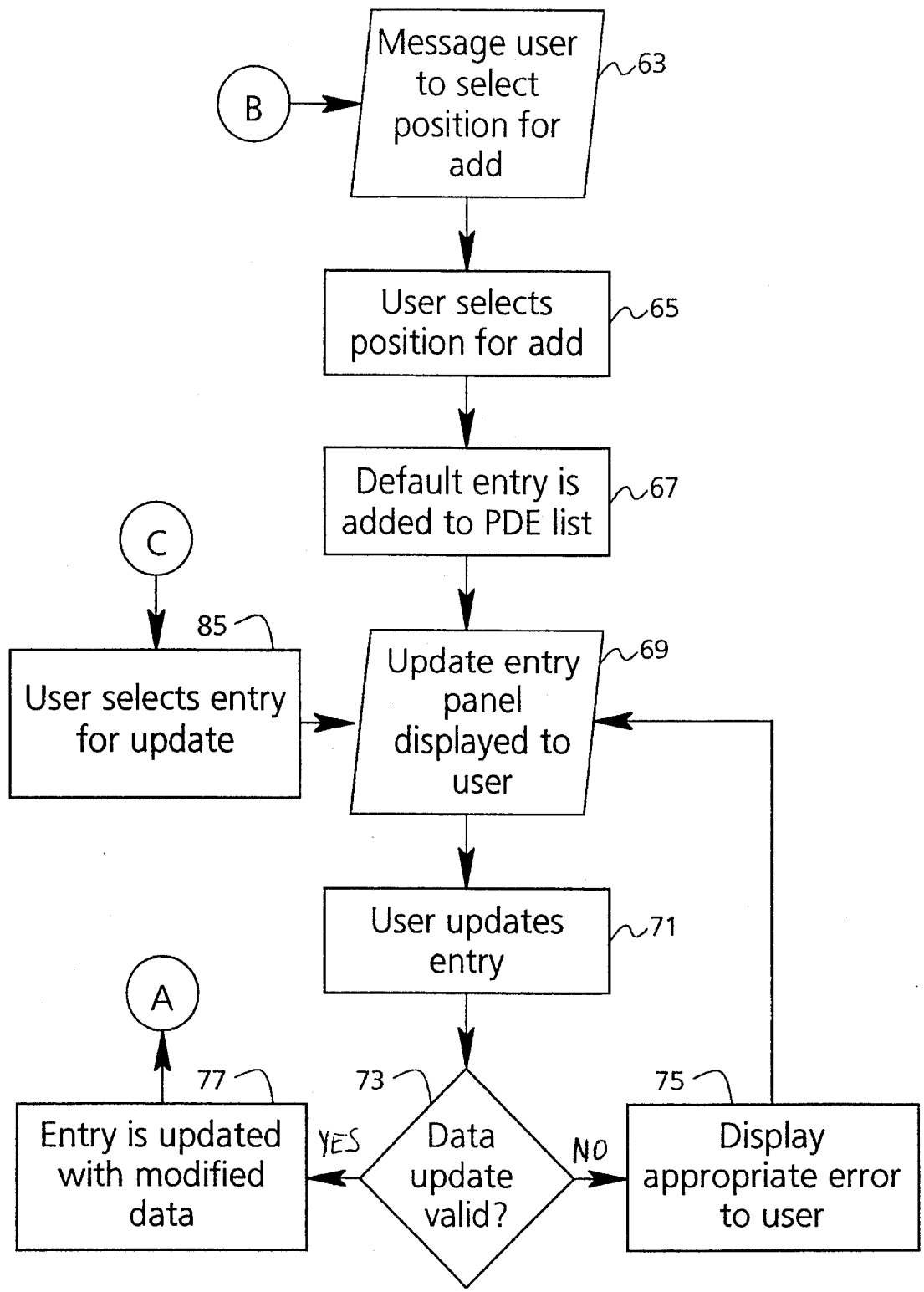

Referring to the flow charts of FIGS. 6a and 6b, the method of constructing or editing a New Presentation will be discussed. The editor method is invoked by the user, step 51, upon an appropriate predetermined command. In step 53, the existing Presentation Description Entries in a New Presentation are displayed to the user on the computer screen 17. Of course if the New Presentation is too large to be shown on the same screen, then the user can scroll up or down to view individual Presentation Description Entries. One display format is shown in FIG. 4, wherein the parameters of each Presentation Description Entry 43 are displayed in a row across the screen. The user selects an edit function of either adding an entry, deleting an entry, updating an entry or quitting. There are many ways to make the selection, depending on the particular user interface. For example, the function keys on the keyboard 19 can be utilized to select the desired edit function. Alternatively, a mouse can be used to select the edit function by way of a pull down menu. If this is a New Presentation, no entries are shown.

Once the edit function is selected, the method determines if it is to add an entry, step 55, delete an entry, step 57, update an entry, step 59 or quit the editor method, step 61. If the edit function is to add an entry, a YES result from step 55, then a message is provided to the user to select the position in the New Presentation 41 to add the New Presentation Description Entry, step 63. The user selects the position, step 65, and a Presentation Description Entry, with default values in its parameters, is added to the New Presentation at the selected location, step 67. The default values are modified in steps 69 et seq. In step 69, the New Presentation Description Entry is displayed or, more broadly, provided to the user. Because the Presentation Description Entries provide multimedia presentations, a Presentation Description Entry may be provided to the user in a user friendly fashion, wherein the Presentation Portion Library entry referenced by the Presentation Description Entry is executable on the specified output device. For example, if the Presentation Description Entry is a segment of video, then the Presentation Description Entry would be provided to the user as a video, showing the images on the screen along with sound. The user can fast forward, stop, reverse and play the video much like a video casette recorder wherein the user can manipulate the video tape on a video tape casette. This enables the user to more easily select the various parameters of a Presentation Description Entry and its associated Presentation Portion Library entry. In step 71, the user updates the entry with the desired parameters. In step 73, the method determines if the update data is valid. If NO, then an error is reported to the user, step 75, and the method loops back to step 69, so that the user can correct the error. If the result of step 73 is YES, then the entry is updated with the modified data, step 77. The method then returns to step 53 so that another entry can be edited.

If the edit function is to delete an entry, a NO result is produced by step 55 and a YES result is produced by step 57. In step 79, the user selects the entry or entries for deletion. Selection can be by the keyboard, a mouse, etc. In step 81, the user initiates the delete action, such as pressing ENTER key. In step 83, the selected entries are deleted. The method then returns to step 53.

If the edit function is to update an entry, a NO result is produced by step 57 and a YES result is produced by step 59, wherein the user selects the entry which is to be updated, step 85. The method then proceeds to steps 69 et seq., wherein the entry parameters are updated as previously described.

If the edit function is QUIT, a NO result is produced by step 59 and a YES result is produced by step 61. The method then ends, step 87. If the result of step 61 is NO, an invalid function has been selected and the method returns to step 53.

Once a New Presentation has been constructed, it may be executed. Execution may be utilized to further edit the New Presentation, wherein portions of the presentation that require a change can be identified. Also, of course, execution is utilized to perform the presentation to an audience.

Figure 7:
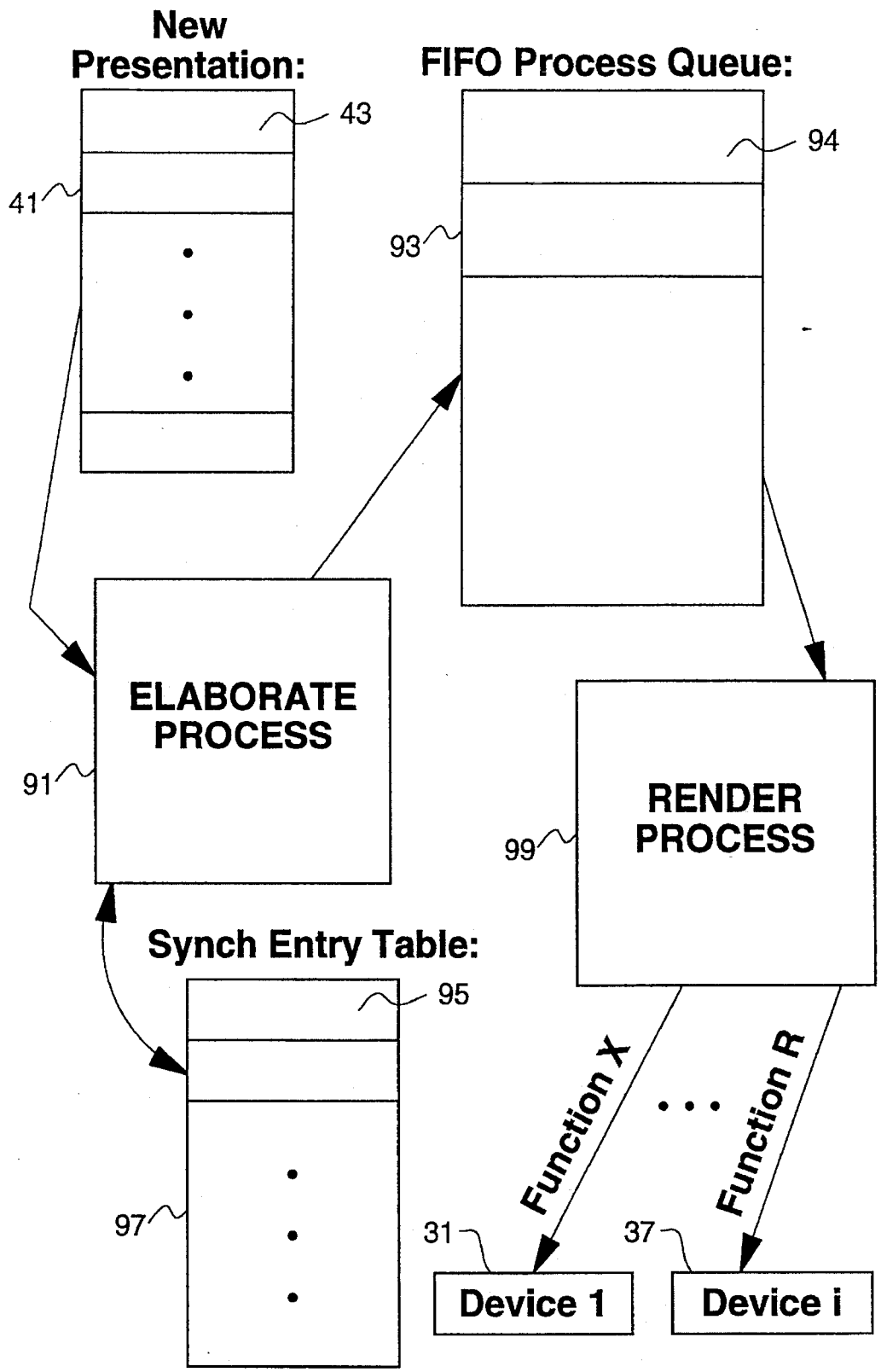
FIG. 7 is a block diagram showing the method of the present invention, in accordance with a preferred embodiment.
Figure 10A:
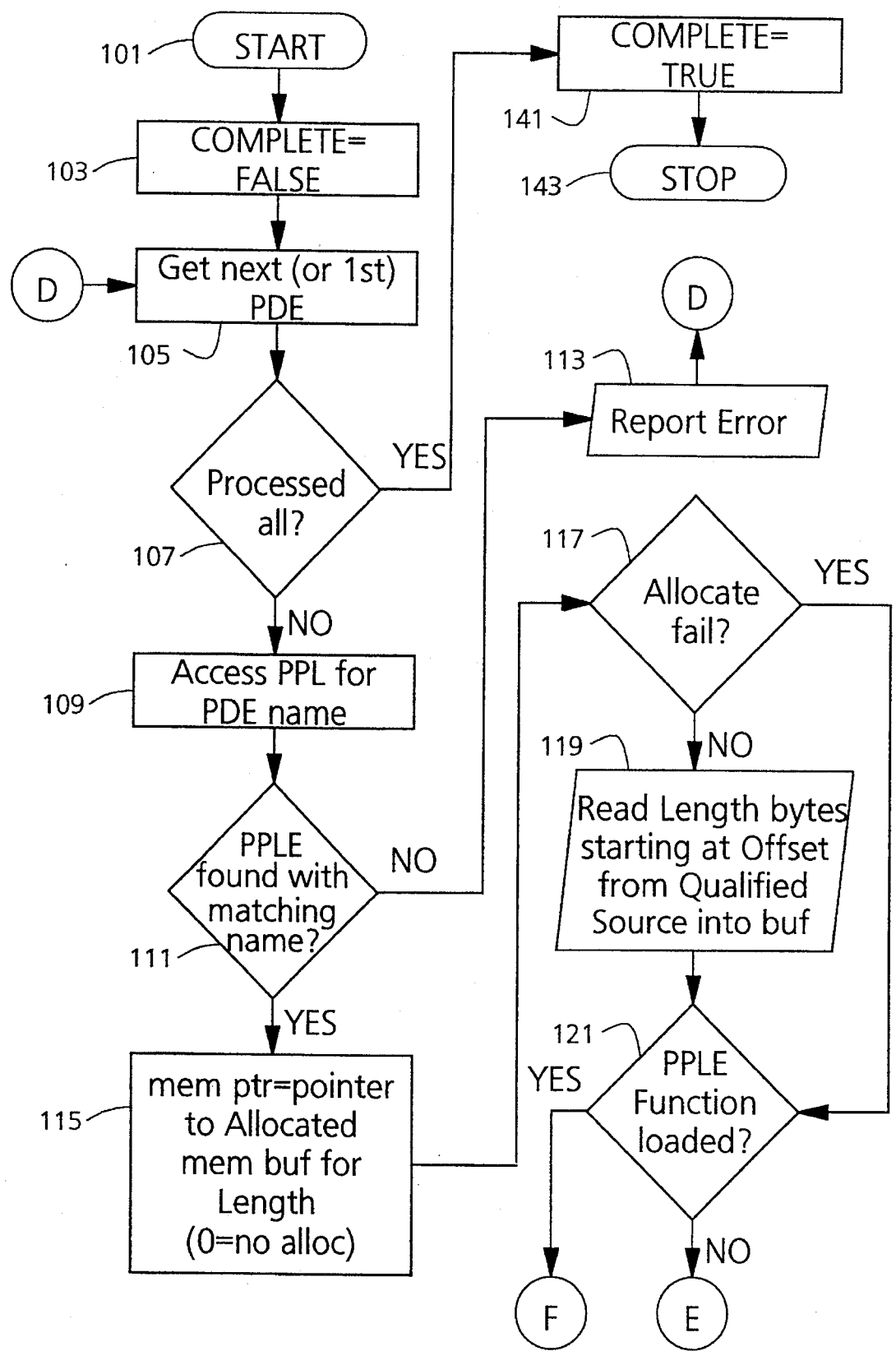
FIGS. 10a–10d are flow charts showing the Elaborate Process.
Figure 10B:
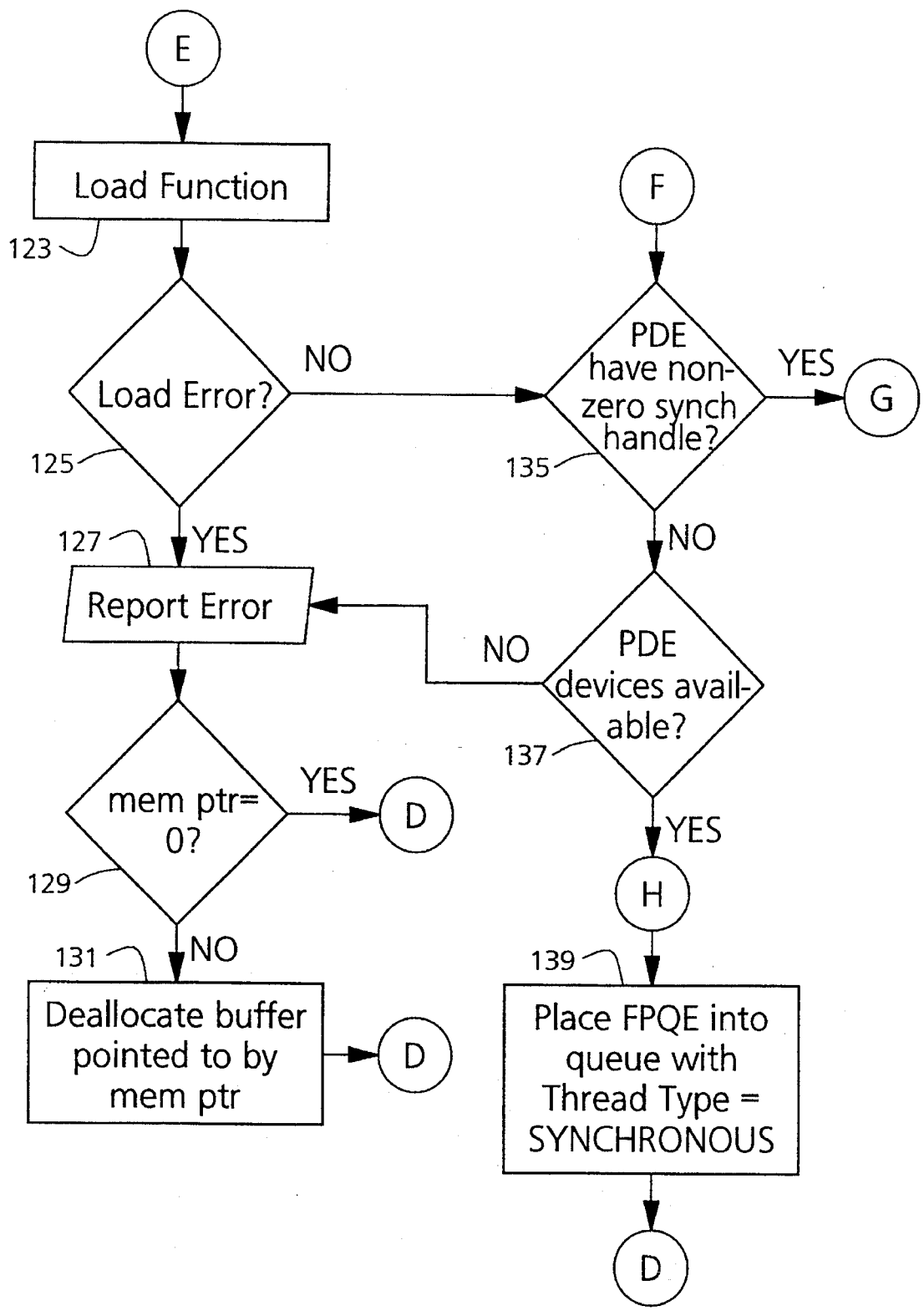
Figure 10C:
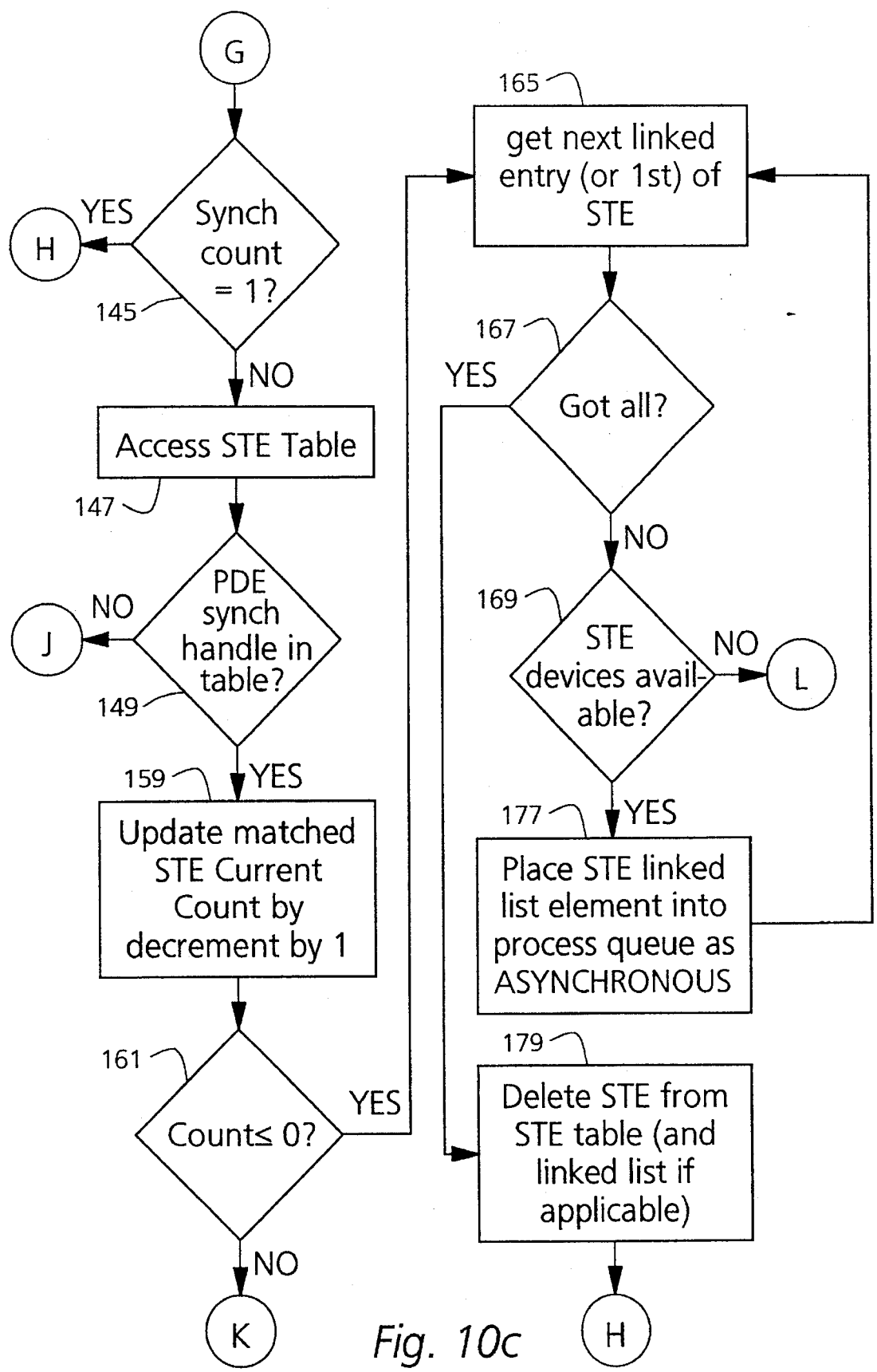
Figure 10D:
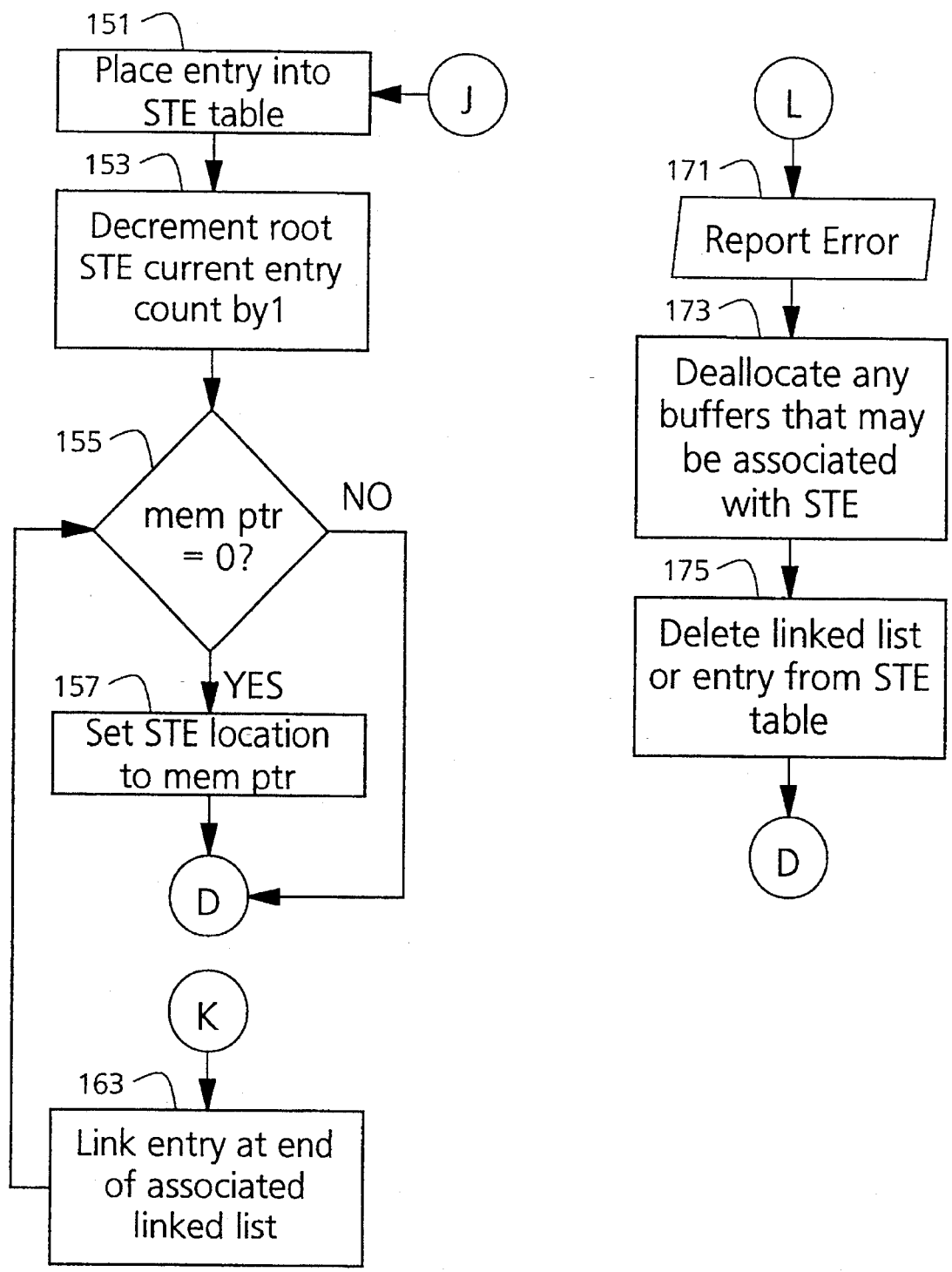

Referring now to FIG. 7, a brief overview of the execution of a New Presentation will be described, followed by a more detailed description using the flow chart of FIGS. 10a–11.

Upon execution of the New Presentation 41, an elaborate process 91 is utilized to preprocess the individual Presentation Description Entries. This preprocessing readies the Presentation Description Entries for rapid execution whenever the New Presentation is played. The Elaborate Process 91 does this by parsing through the New Presentation, taking each Presentation Description Entry in turn and processing that entry for placement onto a FIFO Process Queue 93.

For each Presentation Description Entry, the associated Presentation Portion Library entry is accessed and the respective Qualified Source and Function are loaded into memory. Then, the Elaborate Process 91 determines if the Presentation Description Entry has a Synch Handle. If the Presentation Description Entry has no Synch Handle, then the pertinent parameters of the Presentation Description Entry and its associated Presentation Portion Library entry are grouped together into a FIFO Process Queue Element 94 (to be defined later) and placed into the First-In-First-Out (FIFO) Process Queue 93. If the Presentation Description Entry does have a Synch Handle, then the pertinent parameters are grouped together into a Synchronization Table Entry (STE) 95 and placed into a Synchronization Entry Table 97. The Synchronization Entry Table 97 is used as a temporary work table to link all of the Presentation Description Entries having the same Synch Handle together. After all of the Presentation Description Entries with the same Synch Handle have been linked together, the linked list is placed into the FIFO Process Queue 93.

After the New Presentation has been at least partially processed by the Elaborate Process 91, the render process 99 can begin. Thus, the Elaborate Process 91 need not be fully completed before the Render Process is begun. This is particularly true if the elaborate and Render Processes are executed on separate computers, with the elaborating computer being faster in speed than the rendering computer. The Render Process 99 takes the entries 94 out of the FIFO Process Queue 93. If the entry is of the unlinked type, wherein the entry is unlinked to other entries, then the entire entry is executed before the next entry is obtained from the FIFO Process Queue. If the Delay Time is zero, then the entry will be played when executed. Playing the entry entails operating the selected output device or devices. If the Delay Time is a positive value, the playing will be delayed from the start of execution. If the entry is of the linked type, then all of the linked entries are executed together.

Referring now to FIG. 8, the entries 95 of the Synch Entry Table 97 will be discussed. Each entry 95 has the following parameters: Synch Handle, Current Entry Count, Location, Offset, Length, Function, Function Arguments, Delay Time, Repetition Count, Peripheral Device List and Next Element Pointer. The Synch Handle is as described above in conjunction with the Presentation Description Entry 43. The Current Entry Count is the Synch Count diminished by the number of entries having the same Synch Handle that have been encountered by the Elaborate Process. The initial value of the Current Entry Count is equal to the Synch Count for the particular Synch Handle. As each entry with the respective Synch Handle is processed, the Current Entry Count is decremented by one. The Location is the memory pointer to a buffer with matter read from the respective Qualified Source. If memory was not available at the time of reading the Qualified Source, then the Location is still the Qualified Source. If the first byte is 0, then that implies that the following bytes represent a memory pointer. Offset, Length, Function and Function Arguments are as described with reference to the Presentation Portion Library entry (see FIG. 3). If Length is less than or equal to 0, then that implies that Location is a memory pointer. Delay Time, Repetition Count and Peripheral Device List are as defined with reference to the Presentation Description Entry (see FIG. 2). Next Element Pointer is a pointer to the next synchronized entry with the same Synch Handle. A value of 0 for the Next Element Pointer implies that this is the last in the linked list. A non-zero value points to another Synch Table Entry. Thus, the Synch Entry Table 97 is a list of FIFO elements wherein each element may be a linked list.

Referring now to FIG. 9, the elements 94 of the FIFO Process Queue 93 will be discussed. Each element has the following parameters: Thread Type, Location, Offset, Length, Function, Function Arguments, Delay Time, Repetition Count and Peripheral Device List. The Thread Type has a value of either ASYNCHRONOUS or SYNCHRONOUS. ASYNCHRONOUS implies that a separate thread is started to process the element 94 and immediately process the next FIFO Process Queue Element (because the FIFO Process Queue Elements are to be executed together). SYNCHRONOUS implies that the element 94 is executed in its entirety before the next FIFO Process Queue Element is obtained and processed. Location, Offset, Length, Function, Function Arguments, Delay Time, Repetition Count and Peripheral Device List are all as described with reference to the Synchronization Table Entry 95 of FIG. 8.

Both the Synchronization Table Entry 95 and the FIFO Process Queue Element 94 contain parameters from the respective Presentation Description Entry 43 and Presentation Portion Library entry 47 that are being processed by the Elaborate Process 91. The following parameters are obtained from the Presentation Description Entry: Delay Time, Repetition Count and Peripheral Device List. The other parameters of the Presentation Description Entry, Portion Name, Synch Handle and Synch Count are used by the Elaborate Process 91 to preprocess the Presentation Description Entry. The Presentation Portion Library entry supplies the following parameters to the Synchronization Table Entry 95 and the FIFO Process Queue Element 94: Offset, Length, Function and Function Arguments, which are also used by the Render Process 99. The other parameters of the Presentation Portion Library entry are Portion Name and Qualified Source, which are used by the Elaborate Process 91.

The Elaborate Process 91 will now be described with reference to FIGS. 10a–10d. The process is started, step 101, whenever a user executes the New Presentation 41. Next, a flag COMPLETE is set to FALSE, step 103. In step 105, the process gets the first Presentation Description Entry 43 (or the next Presentation Description Entry if the first Presentation Description Entry has already been processed) from the New Presentation 41. Then, the process determines if all of the Presentation Description Entries in the New Presentation have been processed, step 107.

If the result of step 107 is NO, then the process accesses the Presentation Portion Library entry 47 having the same Portion Name as the Presentation Description Entry that is being currently processed, step 109. The process determines if a Presentation Portion Library entry has been found with a matching Portion Name, step 111. If no such Presentation Portion Library is found, the process reports an error, step 113, and in the preferred embodiment, continues on to get the next Presentation Description Entry, step 105. If the result of step 111 is YES, then in step 115, the memory pointer is set to an allocated memory buffer for the Length. If there is no allocation, that is there is insufficient memory, then the memory pointer is set to 0. In step 117, the method determines if the allocation of memory has failed. If the result of step 117 is NO, that is memory has been allocated, then the process reads the Qualified Source into the memory buffer, step 119. If an Offset and a Length are specified, then that portion of the Qualified Source starting at the Offset is read for the specified Length. The process proceeds to step 121. If the result of step 117 is YES, the process skips step 119 and proceeds to step 121. In step 121, the process determines if the Presentation Portion Library entry function is already loaded. If YES, then the process proceeds to step 135. If NO, then the function is loaded, step 123 and the process determines if there is a load error, step 125. If the result of step 125 is YES, there is a load error, then the process reports the error, step 127 and proceeds to deallocate the memory. In step 129, the process determines if the memory pointer=0. If YES, then the process proceeds to step 105 to get the next Presentation Description Entry. If the result of step 129 is NO, then the memory buffer pointed to by the memory pointer is deallocated, step 131, and the process proceeds to step 105.

If the result of step 125 is NO, there is no load error, then the process determines if the Synch Handle of the Presentation Description Entry being processed is non-zero, step 135. If NO, the Synch Handle is not non-zero (that is the Synch Handle is 0), then in step 137, the process determines if the output devices specified by the Peripheral Device List are available. If NO, then an error is reported, step 127. If YES, then a FIFO Process Queue Element 94 is placed into the FIFO Process Queue 93 with the Thread Type set to SYNCHRONOUS. The FIFO Process Queue Element contains the parameters from the Presentation Description Entry and the Presentation Portion Library as described earlier with reference to FIG. 9. Then, the process proceeds to step 105, where the process is repeated for the next Presentation Description Entry in the New Presentation 41.

However, if the Synch Handle of the Presentation Description Entry being processed is non-zero, then a YES is produced by step 135, and the process proceeds to step 145. In step 145, the process determines if the Synch Count=1. If YES (that is there is only one Presentation Description Entry with the same Synch Handle), then the Presentation Description Entry is treated the same way as a Presentation Description Entry with a 0 Synch Handle, and the process proceeds to step 139.

If the result of step 145 is NO, then the Synch Entry Table 97 is accessed, step 147. The process determines if the Presentation Description Entry Synch Handle is already in the Synch Entry Table 97, step 149. A NO result implies that this is the first time a Presentation Description Entry having this Synchronization Handle has been processed, while a YES result implies that one or more Presentation Description Entries with this Synch Handle have already been processed. Assuming for the moment a NO result in step 149 has been produced, the entry is placed into the Synchronization Entry Table 97, step 151. The entry is as defined with respect to FIG. 8 and includes parameters from the Presentation Description Entry and Presentation Portion Library entry that are being processed. The Synchronization Entry Table 97 maintains a root Current Entry Count for each Synch Handle, which is initially set to the value of the Synch Count of the first Presentation Description Entry having the respective Synch Handle that is processed. In step 153, this root Current Entry Count is decremented by 1. In step 155, the process determines if any memory has been allocated by determining if the memory pointer=0. If YES, memory has been allocated, then in step 157, the memory pointer is set to the location of the Synchronization Table Entry 95 in the Synchronization Entry Table 97. This is reflected in the Location Parameter. The process then proceeds back to step 105 to get the next Presentation Description Entry. If the result of step 155 is NO, then step 157 is bypassed and the process proceeds to step 105.

If the Synch Handle is already in the Synchronization Entry Table 97, then a YES result is produced in step 149, and the process updates the root Current Entry Count for the respective Synch Handle, step 159. Updating is performed by decrementing the current entry count by 1. In step 161, the process determines if the current entry count is less than or equal to 0. If YES, then the Presentation Description Entry being processed is the last Presentation Description Entry bearing the respective Synch Handle. For example, the Presentation Description Entry being processed is the fourth of four Presentation Description Entries having the Synch Handle=FLASH. Assuming for the moment that step 161 produces a NO result, wherein the Presentation Description Entry is not the last one, then a link list is built of all of the Synchronization Table Entries that have been constructed from Presentation Description Entries with the same Synch Handle. In step 163, the Synchronization Table Entry being processed is linked to the end of the link list that is associated with the same Synch Handle. For example, if the second Presentation Description Entry having Synch Handle=FLASH is being processed, then the Synchronization Table Entry corresponding to the second Presentation Description Entry is linked to the end of the Synchronization Table Entry that corresponds to the first Presentation Description Entry having its Synch Handle=FLASH. Then, the process performs step 155 et seq. wherein if memory has been allocated, then the memory pointer is set to the location of the Synchronization Table Entry (in the example the second FLASH synchronization table) in the Synchronization Entry Table 97.

Now assuming that the Presentation Description Entry being processed is the last one with that Synch Handle (for example, the fourth Presentation Description Entry of 4), a YES result is then produced by step 161. Each linked entry in the synchronized sequence (that is with the same Synch Handle) is then placed into the FIFO Process Queue 93. In step 165, the process gets the first linked entry. In step 167, the process determines if this is the last linked entry. If the result of step 167 is NO, then the process determines if the output devices in the Peripheral Device List are available, step 169. If the result of step 169 is NO, then the error is reported, step 171, any memory buffers associated with the Synchronization Table Entry are deallocated, step 173, and the linked list or entry from the Synchronized Entry Table is deleted, step 175. The method then returns to step 105 to get the next Presentation Description Entry. However, if the result of step 169 is YES, the output devices are available, then the process proceeds to step 177, where the Synchronization Table Entry linked list element is placed in the FIFO Process Queue 93 as a FIFO Process Queue Element 94. The parameters that are transferred from the Synchronization Entry Table 97 to the FIFO Process Queue are: Location, Offset, Length, Function, Function Arguments, Delay Time, Repetition Count and Peripheral Device List. The Thread Type is set to ASYNCHRONOUS. The Synch Handle, Current Entry Count and Next Element Pointer are not needed to execute the FIFO Process Queue Element 94 and thus are not transferred to the FIFO Process Queue.

From step 177, the process repeats steps 165 et seq. In this manner, all of the entries in the linked list are loaded one after another into the FIFO Process Queue. When the last entry has been loaded, step 167 produces a YES result, wherein in step 179, the Synchronization Table Entry 195 and its linked list is deleted from the Synchronization Entry Table 97. This is done because, for those Synch Handle entries, the table 97 is no longer needed. Then, the process returns to step 139.

If all of the Presentation Description Entries 43 of the New Presentation 41 have been processed, then this is detected in step 107, which produces a YES result. In step 141, the flag COMPLETE is set to TRUE. The Elaborate Process then stops, step 143.

Figure 11:
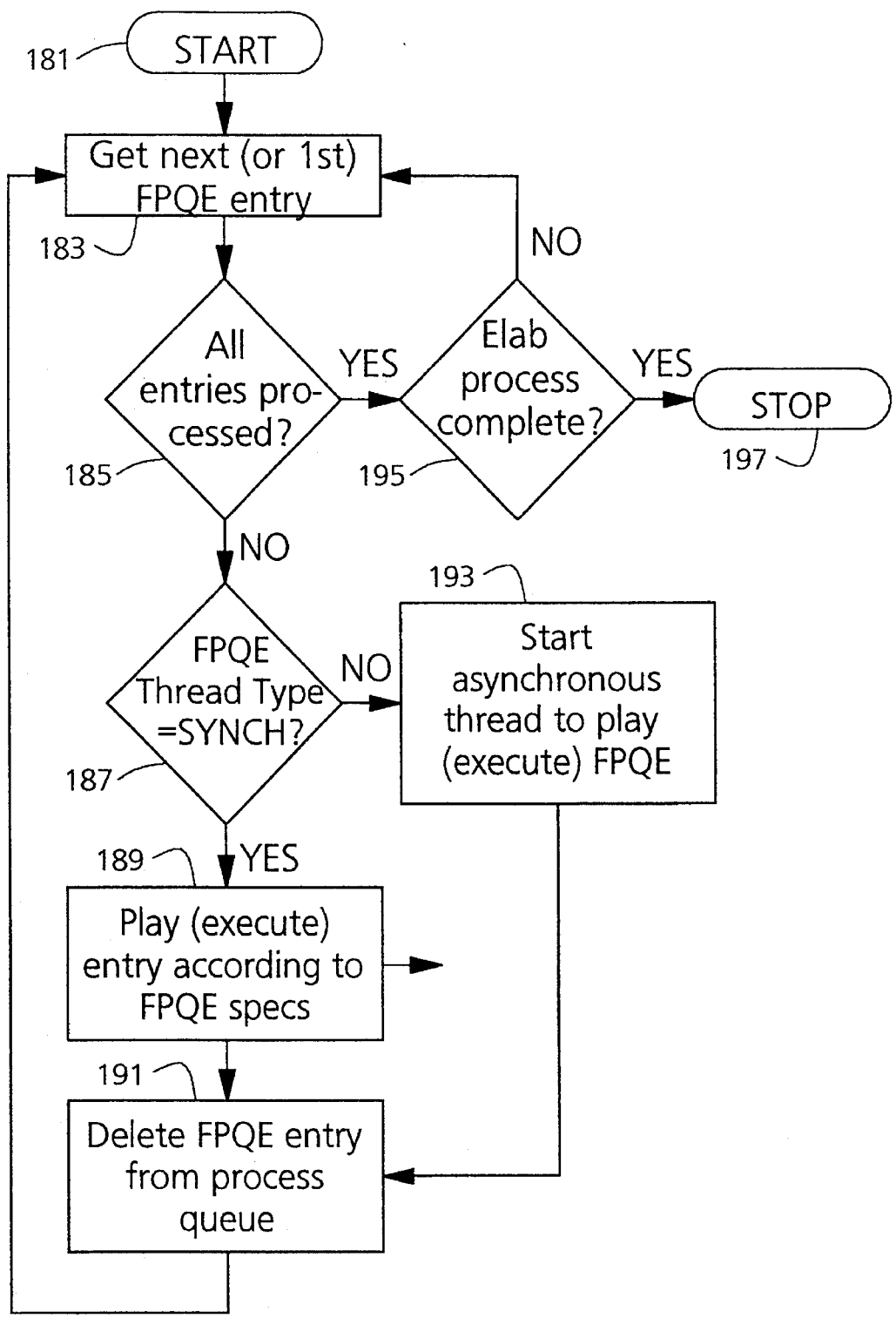
FIG. 11 is a flow chart showing the Render Process.

The Render Process is shown in FIG. 11. The process is started, step 181, wherein the first (or next) FIFO Process Queue Element 94 is obtained from the FIFO Process Queue 93, step 183. In step 185, the process determines if all of the entries have been processed. If NO, then the process determines the Thread Type, step 187. A thread is a slice of execution time on the render computer. If the Thread Type of the FIFO Process Queue Element is SYNCHRONOUS, then a YES result is produced in step 187. A SYNCHRONOUS Thread Type implies that a single thread is to be executed. In step 189, the element is executed according to the parameter values. Because the Thread Type is SYNCHRONOUS, the element is executed in its entirety before the Render Process gets the next FIFO Process Queue Element. Even though the Thread Type is SYNCHRONOUS, implying that only a single thread is to be executed, in actuality plural threads may be spawned and executed from the main synchronous thread. This is because the Peripheral Device List may contain plural output devices. For each output device, a thread is spawned and executed together with the other threads in the same FIFO Process Queue Element. After the FIFO Process Queue Element has been executed, then it is deleted from the FIFO Process Queue, step 191. The process then returns to step 183 to get the next FIFO process element.

If the Thread Type of the FIFO Process Queue Element is ASYNCHRONOUS, then the process proceeds to step 193 to execute the ASYNCHRONOUS thread. An ASYNCHRONOUS thread implies that processing proceeds immediately to step 191 after the main asynchronous thread is spawned for execution. Thus, as soon as the first thread has begun executing, the next asynchronous element, which is the next element in the FIFO Process Queue, is executed. In steps 189 and 193, when a main thread is executed, one or more children threads could be spawned for execution as well. These children threads are for the additional output devices that are specified by the FIFO Queue element.

If all of the FIFO Process Queue Elements have been processed, a YES result from step 195, then the Render Process 99 determines if the Elaborate Process 91 is still working, step 195. If it is, then the Render Process waits until more elements are loaded into the FIFO Process Queue by the Elaborate Process. This is determined by checking the status of the COMPLETE flag. COMPLETE=FALSE as long as Presentation Description Entries are being processed by the Elaborate Process 91. If NO, the Elaborate Process is not yet complete, then the Render Process returns to step 183, where through an implied wait (or alternatively by polling) waits for another element to be placed into the FIFO Process Queue by the Elaborate Process. The result of step 195 is YES when COMPLETE=TRUE. The process then stops, step 197. It is undesirable to wait for a FIFO Queue element because such a delay could produce an undesired delay in the Presentation. Therefore, a NO result to step 195 is undesirable.

Although the Delay Time parameter of FIGS. 2, 8 and 9 has been described as the amount of time that a Presentation Description Entry (i.e. its parameters) is delayed before being played, this parameter could be represented as a distinct date or time stamp. Thus, when an element with a time stamp is obtained from the FIFO Queue, and the element is executed, the data is not played on the specified output device until the specified time occurs.

The foregoing disclosure and the showings made in the drawings are merely illustrative of the principles of this invention and are not to be interpreted in a limiting sense.

We claim:

1. A method of creating a production from plural multimedia output devices connected to a data processing system, said method being implemented on said data processing system, comprising the steps of:

a) providing a presentation that contains plural descriptions, with each description specifying data that is to be provided to a selection of said output devices, each description specifying parametrical values for playing said respective data on said respective selection of output devices;

b) said step of providing said presentation further comprises the step of ordering said descriptions in a list in a predetermined order, c) said step of providing said presentation further comprises the step of providing synchronizing information which provides that specific plural descriptions are synchronized so as to be executed at the same time;

d) readying said presentation for execution by processing each description, said step of processing each description further comprising loading said respective data into memory and loading an element corresponding to said description into a queue in said predetermined order, said queue being separate from said memory that has said respective data loaded therein, said element comprising said parametrical values and the location of said data in said memory;

e) said step of readying said presentation for execution further comprises the step of processing each description in said predetermined order, f) said step of readying said presentation for execution further comprises the step of determining from said synchronizing information which descriptions are synchronized and linking together in said queue those elements that correspond to said synchronized descriptions;

g) executing said presentation by taking each of said elements in turn from said queue and executing said specified data on said selection of output devices in accordance with said parametrical values;

h) said step of executing said presentation further comprises the step of executing said linked elements together.

2. The method of claim 1 wherein said step of providing synchronizing information further comprises the steps of providing said synchronizing information as one of the parametrical values of said synchronized descriptions and providing with each synchronized description the number of said synchronized descriptions that are synchronized.

3. The method of claim 1, wherein said step of providing a presentation further comprises the step of specifying for one of the parametrical values of each description a specified time that said respective data is to be provided to said selection of output devices.

4. The method of claim 1, wherein said step of providing a presentation further comprises the step of specifying for one of the parametrical values of each description a qualified source of said data.

5. The method of claim 4, wherein said step of providing a presentation further comprises the step of specifying for one of the parametrical values of each description an offset of said qualified source representing the starting part in said qualified source for said respective data.

6. The method of claim 5, wherein said step of providing a presentation further comprises the step of specifying for one of the parametrical values of each description a length from said offset representative of the amount of said respective data.

7. The method of claim 1, wherein said step of providing a presentation further comprises the step of specifying for one of the parametrical values of each description a repetition count representing the number of times said respective data is to be played.

8. The method of claim 1, wherein said step of providing a presentation further comprises the step of specifying for one of the parametrical values of each description a function for playing said data on said output devices.

9. The method of claim 1 wherein:

a) said step of providing said presentation further comprises the step of providing a synchronized description that is out of order in said presentation;

b) said step of readying said presentation for execution further comprises the step of storing and linking together said elements corresponding to said synchronized descriptions in temporary storage until all of said elements corresponding to said synchronized descriptions, as determined by the number of synchronized descriptions, have been linked together and then loading said linked elements together in said queue.

10. A method of creating a production from plural multimedia output devices connected to a data processing system, comprising the steps of:

a) providing a presentation that contains plural descriptions, with each description specifying data that is to be provided to a selection of said output devices, each description specifying parametrical values for playing said respective data on said respective selection of output devices;

b) said step of providing said presentation further comprises the step of ordering said descriptions in a list in a predetermined order;

c) said step of providing said presentation further comprises the step of providing synchronizing information which provides that specific plural descriptions are synchronized so as to be executed at the same time;

d) said step of providing synchronizing information further comprises the steps of providing said synchronizing information as one of the parametrical values of said synchronized descriptions and providing with each synchronized description the number of said synchronized descriptions that are synchronized;

e) said step of providing said presentation further comprises the step of providing a synchronized description that is out of order in said presentation;

f) readying said presentation for execution by processing each description, said step of processing each description further comprising loading said respective data into memory and loading an element corresponding to said description into a queue in said predetermined order, said element comprising said parametrical values and the location of said data in said memory;

g) said step of readying said presentation for execution further comprises the step of processing each description in said predetermined order;

h) said step of readying said presentation for execution further comprises the step of determining from said synchronizing information which descriptions are synchronized and linking together in said queue those elements that correspond to said synchronized descriptions;

i) said step of readying said presentation for execution further comprises the step of storing and linking together said elements corresponding to said synchronized descriptions in temporary storage until all of said elements corresponding to said synchronized descriptions, as determined by the number of synchronized descriptions, have been linked together and then loading said linked elements together in said queue;

j) executing said presentation by taking each of said elements in turn from said queue and executing said specified data on said selection of output devices in accordance with said parametrical values;

k) said step of executing said presentation further comprises the step of executing said linked elements together.

11. A system for creating a production from plural multimedia output devices connected to a data processing system, comprising;

a) means for providing a presentation that contains plural descriptions, with each description specifying data that is to be provided to a selection of said output devices, each description specifying parametrical values for playing said respective data on said respective selection of output devices, b) said means for providing said presentation further comprises means for ordering said descriptions in a list in a predetermined order, c) said means for providing said presentation further comprises means for providing synchronizing information which provides that specific plural descriptions are synchronized so as to be executed at the same time;

d) means for readying said presentation for execution by processing each description, said means for processing each description further comprising means for loading said respective data into memory and for loading an element corresponding to said description into a queue in said predetermined order, said queue being separate from said memory that has said respective data loaded therein, said element comprising said parametrical values and the location of said data in said memory;

e) said means for readying said presentation for execution further comprises means for processing each description in said predetermined order;

f) said means for readying said presentation for execution further comprises means for determining from said synchronizing information which descriptions are synchronized and for linking together in said queue those elements that correspond to said synchronized descriptions;

g) means for executing said presentation by taking each of said elements in turn from said queue and executing said specified data on said selection of output devices in accordance with said parametrical values;

h) said means for executing said presentation further comprises means for executing said linked elements together.

12. The system of claim 11 wherein said means for providing synchronizing information further comprises means for providing said synchronizing information as one of the parametrical values of said synchronized descriptions and for providing with each synchronized description the number of said synchronized descriptions that are synchronized.

13. The system of claim 11, wherein said means for providing a presentation further comprises means for specifying for one of the parametrical values of each description a specified time that said respective data is to be provided to said selection of output devices.

14. The system of claim 11, wherein said means for providing a presentation further comprises means for specifying for one of the parametrical values of each description a qualified source of said data.

15. The system of claim 11, wherein said means for providing a presentation further comprises means for specifying for one of the parametrical values of each description an offset of said qualified source representing the starting part in said qualified source for said respective data.

16. The system of claim 15, wherein said means for providing a presentation further comprises means for specifying for one of the parametrical values of each description a length from said offset representative of the amount of said respective data.

17. The system of claim 11, wherein said means for providing a presentation further comprises means for specifying for one of the parametrical values of each description a repetition count representing the number of times said respective data is to be played.

18. The system of claim 11, wherein said means for providing a presentation further comprises means specifying for one of the parametrical values of each description a function for playing said data on said output devices.

19. The system of claim 11 wherein:

a) said means for providing said presentation further comprises means for providing a synchronized description that is out of order in said presentation;

b) said means for readying said presentation for execution further comprises means for storing and linking together said elements corresponding to said synchronized descriptions in temporary storage until all of said elements corresponding to said synchronized descriptions, as determined by the number of synchronized descriptions, have been linked together and then for loading said linked elements together in said queue.

20. A system for creating a production from plural multimedia output devices connected to a data processing system, comprising:

a) means for providing a presentation that contains plural descriptions, with each description specifying data that is to be provided to a selection of said output devices, each description specifying parametrical values for playing said respective data on said respective selection of output devices;

b) said means for providing said presentation further comprises means for ordering said descriptions in a list in a predetermined order;

c) said means for providing said presentation further comprises means for providing synchronizing information which provides that specific plural descriptions are synchronized so as to be executed at the same time;

d) said means for providing synchronizing information further comprises means for providing said synchronizing information as one of the parametrical values of said synchronized descriptions and for providing with each synchronized description the number of said synchronized descriptions that are synchronized;

e) said means for providing said presentation further comprises means for providing a synchronized description that is out of order in said presentation;

f) means for readying said presentation for execution by processing each description, said means for processing each description further comprising means for loading said respective data into memory and for loading an element corresponding to said description into a queue in said predetermined order, said element comprising said parametrical values and the location of said data in said memory;

g) said means for readying said presentation for execution further comprises means for processing each description in said predetermined order;

h) said means for readying said presentation for execution further comprises means for determining from said synchronizing information which descriptions are synchronized and for linking together in said queue those elements that correspond to said synchronized descriptions;

i) said means for readying said presentation for execution further comprises means for storing and linking together said elements corresponding to said synchronized descriptions in temporary storage until all of said elements corresponding to said synchronized descriptions, as determined by the number of synchronized descriptions, have been linked together and then for loading said linked elements together in said queue;

j) means for executing said presentation by taking each of said elements in turn from said queue and executing said specified data on said selection of output devices in accordance with said parametrical values;

k) said means for executing said presentation further comprises means for executing said linked elements together.

* * * * *